No. 805,800.  
PATENTED NOV. 28, 1905.  
I. JEFFERSON.  
PLOW ATTACHMENT.  
APPLICATION FILED FEB. 18, 1905.
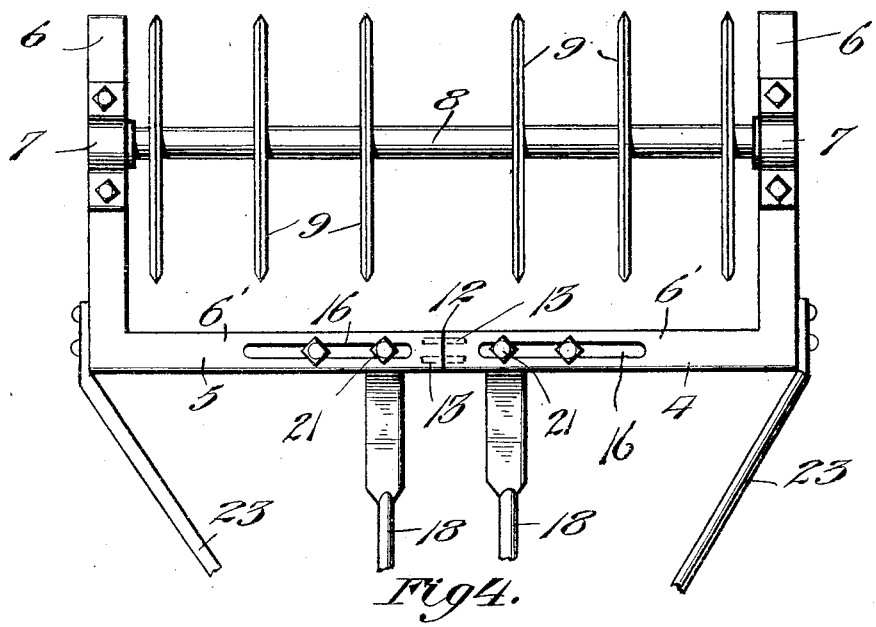
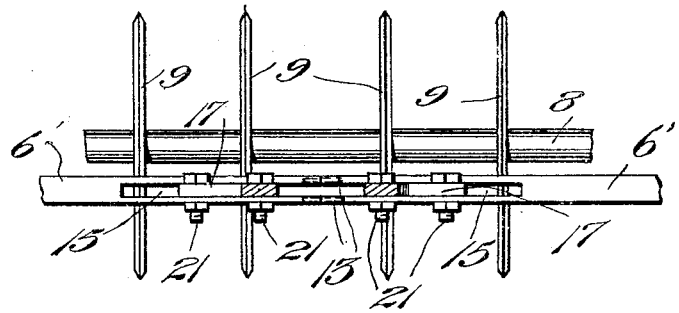
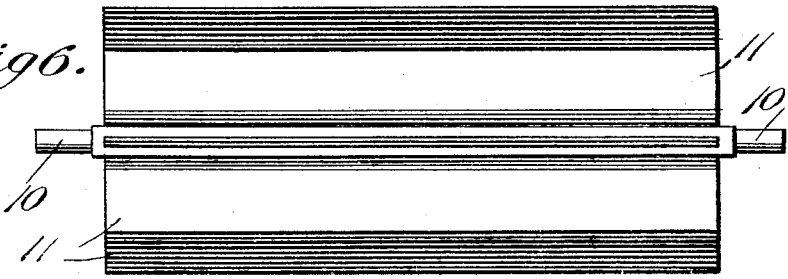
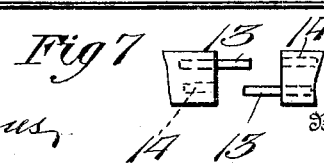
Inventor  
Isaac Jefferson.  
Witnesses  
Phil. E. Barnes,  
W. H. Clarke.  
By Victor J. Evans  
Attorney

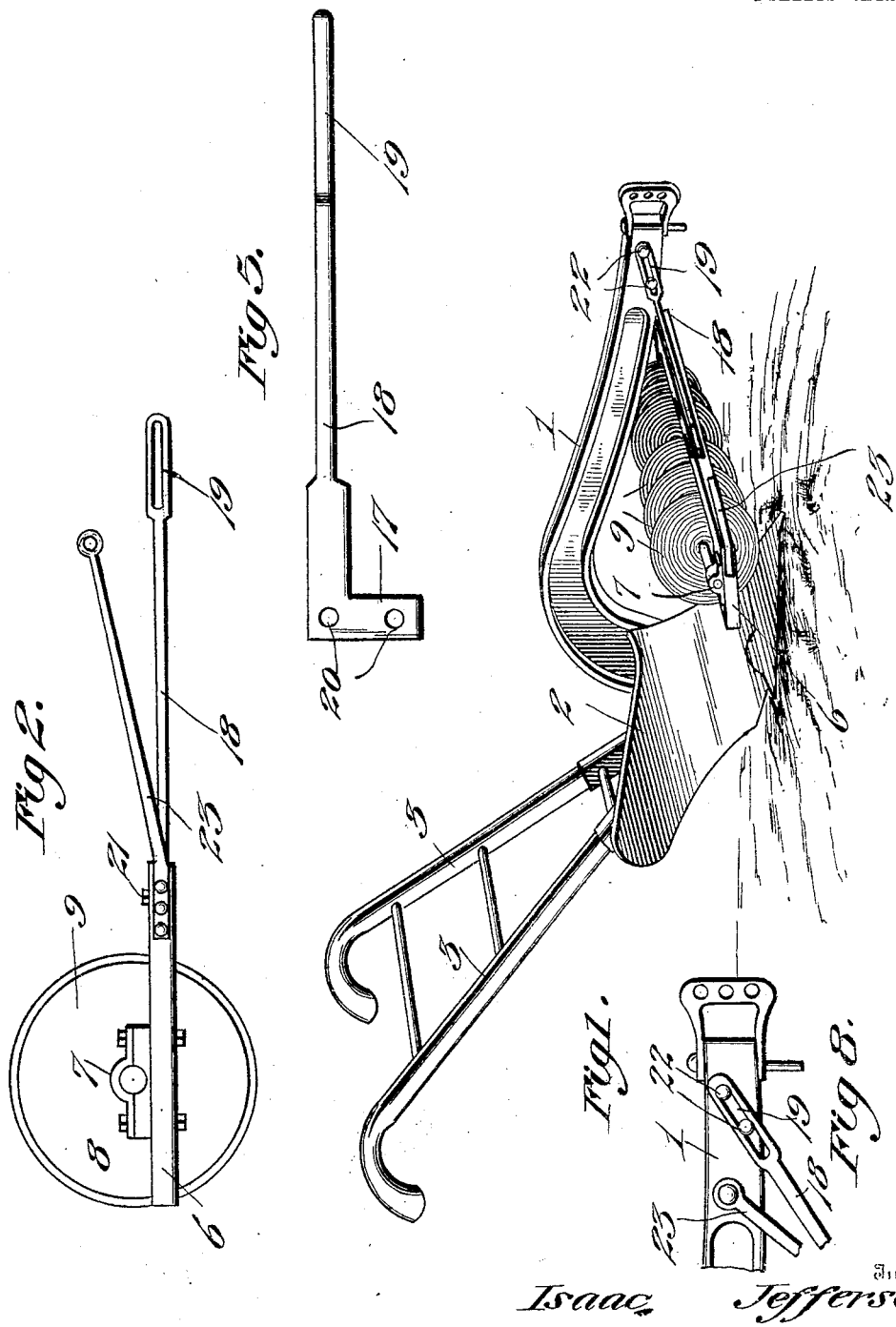

UNITED STATES PATENT OFFICE.

ISAAC JEFFERSON, OF LANGSTON, OKLAHOMA TERRITORY.

PLOW ATTACHMENT.

No. 805,800.  Specification of Letters Patent.  Patented Nov. 28, 1905.

Application filed February 18, 1905. Serial No. 246,291.

*To all whom it may concern:*

Be it known that I, ISAAC JEFFERSON, a citizen of the United States, residing at Langston, in the county of Logan, Oklahoma Territory, have invented new and useful Improvements in Plow Attachments, of which the following is a specification.

This invention relates to plow attachments such as are employed for cutting a field into strips, so that the work of the plow will be facilitated and the formation of large clods avoided.

The objects of the invention are to improve and simplify the construction of such attachments.

With the foregoing and other objects in view, which will appear as the description proceeds, the invention resides in the combination and arrangement of parts and in the details of construction hereinafter described and claimed as a practical embodiment thereof.

In the accompanying drawings, forming a part of this invention, Figure 1 is a perspective view of an ordinary form of plow, showing the improved attachment of this invention in connection therewith. Fig. 2 is a side elevation of the attachment. Fig. 3 is a plan view thereof. Fig. 4 is a front elevation, partly broken away. Figs. 5, 6, 7, and 8 are detail views.

Like reference-numerals indicate corresponding parts in the several views.

The plow in connection with which the improved attachment of the present invention is used may be of any suitable form and construction, said plow preferably comprising the beam 1, moldboard 2, and handles 3. The improved attachment comprises a frame which is made in two parts 4 5, as shown in Fig. 3, each of said parts being formed with a rearward extension 6 and a lateral extension 6'. Journaled in bearings 7, carried by the rearward extensions 6 of each of the parts of the frame is an axle 8, to which is attached a plurality of cutting-disks 9. The disks 9 are employed for cutting the sod or surface soil of a field into a plurality of strips, so that the work of the plow which follows the attachment is facilitated and the formation of large clods avoided. By separating the two parts 4 and 5 of the frame in the manner hereinafter described the axle 8 may be removed from the journal-bearings 7, so as to adapt said bearings to receive the trunnions 10 of a cutting-roll 11, such as shown in Fig. 6. It will be understood that the cutting-roll shown in Fig. 6 is adapted to form a series of transverse cuts in advance of the plow.

In using the attachment of this invention either of the disks illustrated in Fig. 3 or the cutting-roll illustrated in Fig. 6 may be employed or both of these elements may be used interchangeably. For example, in opening one furrow the cutting-disks may be employed for forming a series of strips. Then at the end of the furrow the disks may be removed and the cutting-roll inserted in the frame, so that upon the next trip of the plow the strips will be cut transversely into blocks.

The abutting ends of the lateral extensions 6' of the two parts 4 and 5 of the frame are joined by a pin-and-socket connection, as indicated at 12—that is to say, each lateral extension 6' is provided with one or more pins, such as 13, and with one or more sockets, such as 14, the pins on one lateral extension fitting into the sockets of the other lateral extension. Each of the lateral extensions 6' is also formed with a pair of longitudinal slots 15 and 16, which intersect each other at a right angle. Fitted into the slot 15 of each lateral extension 6' is a lateral extension 17, formed on the rear end of a supporting-arm 18, having at the forward end thereof a longitudinal slot 19. The rear end of each arm 18, together with the lateral extension 17 thereof, is formed with one or more perforations, such as 20, which are engaged by bolts 21, extending through the slot 16. The forward ends of the two supporting-arms 18 are attached to opposite sides of the plow-beam 1 by means of bolts 22, which extend through the slots 19, as shown in Fig. 1. By forming the rear end of each supporting-arm 18 with a lateral extension 17, which is adjustable longitudinally in a slot, such as 15, the two arms 18 may be adjusted toward or from each other to fit plow-beams of different widths.

The outer corners of the parts 4 and 5 of the attachment-frame are supported by brace-rods 23, which are secured to the plow-beam 1 adjacent to the supporting-arms 18, as shown in Fig. 8. By means of the brace-rods 23 and the longitudinal slots 19 in the forward ends of the supporting-arms 18 the attachment-frame is held rigid, so that the cutting-disks or other cutting elements which are carried thereby will be forced to penetrate the subsoil.

Changes in the precise embodiment of invention illustrated and described may be made within the scope of the following claims without departing from the spirit of the invention or sacrificing any of its advantages.

Having thus described the invention, what is claimed as new is—

1. A plow attachment comprising a frame made in separable parts, each of said parts being formed with a pair of longitudinal slots intersecting each other at a right angle, a cutting element journaled between the parts of said frame and adapted to be removed by the separation of said parts, a pair of supporting-arms, each of said arms having a lateral extension fitted into one of the slots of one of the parts of the frame, and bolts extending through the other slot in each part of the frame and being connected with the adjacent lateral extension.

2. A plow attachment comprising a frame made in separable parts having a pin-and-socket connection with each other, each of said parts being formed with a pair of longitudinal slots intersecting each other at a right angle, a cutting element journaled between the parts of said frame and adapted to be removed by the separation of said parts, a pair of supporting-arms formed with longitudinal slots in their forward ends, each of said arms having a lateral extension fitted into one of the slots of one of the parts of the frame, bolts extending through the other slot in each part of the frame and being connected with the adjacent lateral extension, and brace-rods connected with each of the parts of the frame.

In testimony whereof I affix my signature in presence of two witnesses.

ISAAC JEFFERSON.

Witnesses:
J. W. McElroy,
F. Clinton.